United States Patent
Goyal et al.

(10) Patent No.: US 12,332,940 B2
(45) Date of Patent: *Jun. 17, 2025

(54) METHOD AND SYSTEM FOR PROVIDING QUERY SUGGESTIONS BASED ON USER FEEDBACK

(71) Applicant: YAHOO ASSETS LLC, Dulles, VA (US)

(72) Inventors: Amit Goyal, San Francisco, CA (US); Lizi Zhang, Urbana, IL (US); Weize Kong, Amherst, MA (US); Hongbo Deng, San Jose, CA (US); Anlei Dong, Fremont, CA (US); Yi Chang, Sunnyvale, CA (US)

(73) Assignee: YAHOO ASSETS LLC, Dulles, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/987,252

(22) Filed: Nov. 15, 2022

(65) Prior Publication Data

US 2023/0069847 A1 Mar. 9, 2023

Related U.S. Application Data

(63) Continuation of application No. 14/546,635, filed on Nov. 18, 2014, now Pat. No. 11,507,624.

(51) Int. Cl.
G06F 16/00 (2019.01)
G06F 16/9032 (2019.01)
G06N 20/00 (2019.01)

(52) U.S. Cl.
CPC ....... *G06F 16/90324* (2019.01); *G06N 20/00* (2019.01)

(58) Field of Classification Search
CPC . G06F 16/90324; G06F 16/9032; G06F 16/90
USPC ......................................................... 707/751
See application file for complete search history.

(56) References Cited

U.S. PATENT DOCUMENTS

| 9,037,598 B1 | 5/2015 | Morton |
| 2008/0109401 A1* | 5/2008 | Sareen ................ G06F 16/3322 |
| 2013/0018872 A1* | 1/2013 | Velipasaoglu .... G06F 16/90324 707/723 |
| 2013/0031106 A1 | 1/2013 | Schechter et al. |

\* cited by examiner

*Primary Examiner* — Tuankhanh D Phan
(74) *Attorney, Agent, or Firm* — Venable LLP

(57) ABSTRACT

Methods, systems and programming for providing query suggestions based on user feedback. In one example, a prefix of a query is first received. An input including a prefix of a query is received from a user in a search session. A plurality of query suggestions are fetched based on the prefix of the query. Rankings of the plurality of query suggestions are determined based, at least in part, on the user's previous interactions in the search session with respect to at least one of the plurality of query suggestions. The at least one of the plurality of query suggestions has been previously provided to the user in the search session. The plurality of query suggestions are provided in the search session based on their rankings as a response to the input.

20 Claims, 14 Drawing Sheets

| Signal (q,s): for query q in search session s, consider all the previous keystrokes where q appears in the candidate lists |
|---|
| Max dwell time per keystroke where q is in the suggestion list under s |
| Total dwell time per keystroke where q is in the suggestion list under s |
| No. of keystrokes at word boundary where q is in the suggestion list under s |
| No. of keystrokes at space character where q is in the suggestion list under s |
| No. of keystrokes at other character where q is in the suggestion list under s |
| Whether q is the last query or not |
| No. of keystrokes where q is at rank i (i= 1,2,…, 10) of the suggestion list under s |

FIG. 5

METHOD AND SYSTEM FOR PROVIDING QUERY SUGGESTIONS BASED ON USER FEEDBACK

CROSS REFERENCE TO RELATED APPLICATION

The present application is a continuation of U.S. patent application Ser. No. 14/546,635, filed Nov. 18, 2014, the contents of which are hereby incorporated by reference in its entirety.

BACKGROUND

1. Technical Field

The present teaching relates to methods, systems, and programming for online search. Particularly, the present teaching is directed to methods, systems, and programming for providing query suggestions.

2. Discussion of Technical Background

Online content search is a process of interactively searching for and retrieving requested information via a search application running on a local user device, such as a computer or a mobile device, from online databases. Online search is conducted through search engines, which are programs running at a remote server and searching documents for specified keywords and return a list of the documents where the keywords were found. Known major search engines have features called "search/query suggestion" or "query auto-completion (QAC)" designed to help users narrow in on what they are looking for. For example, as users type a search query, a list of query suggestions that have been used by many other users before are displayed to assist the users in selecting a desired search query. Query suggestion facilitates faster user query input by predicting user's intended full queries given the user's inputted query prefix.

However, known query suggestion systems are "static" in the sense that for any prefix in the same search session, the rankings of all the query suggestions for a given prefix are pre-indexed, and the rankings are not adaptive to user feedback throughout the same session. For example, known query suggestion systems would not dynamically demote the rankings of certain query suggestions even the user has shown a strong indication that the user is not interested in those query suggestions.

Therefore, there is a need to provide an improved solution for providing query suggestion to solve the above-mentioned problems.

SUMMARY

The present teaching relates to methods, systems, and programming for online search. Particularly, the present teaching is directed to methods, systems, and programming for providing query suggestions.

In one example, a method, implemented on at least one computing device each having at least one processor, storage, and a communication platform connected to a network for providing query suggestions is presented. An input including a prefix of a query is received from a user in a search session. A plurality of query suggestions are fetched based on the prefix of the query. Rankings of the plurality of query suggestions are determined based, at least in part, on the user's previous interactions in the search session with respect to at least one of the plurality of query suggestions. The at least one of the plurality of query suggestions has been previously provided to the user in the search session. The plurality of query suggestions are provided in the search session based on their rankings as a response to the input.

In a different example, a system having at least one processor, storage, and a communication platform for providing query suggestions is presented. The system includes a query prefix interface, a query suggestion fetching module, a query suggestion ranking module, and a query suggestion interface. The query prefix interface is configured to receive, in a search session, an input including a prefix of a query from a user. The query suggestion fetching module is configured to fetch a plurality of query suggestions based on the prefix of the query. The query suggestion ranking module is configured to determine rankings of the plurality of query suggestions based, at least in part, on the user's previous interactions in the search session with respect to at least one of the plurality of query suggestions. The at least one of the plurality of query suggestions has been previously provided to the user in the search session. The query suggestion interface is configured to provide, in the search session, the plurality of query suggestions based on their rankings as a response to the input.

Other concepts relate to software for providing query suggestions. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for providing query suggestions is presented. The recorded information, when read by the machine, causes the machine to perform a series of processes. An input including a prefix of a query is received from a user in a search session. A plurality of query suggestions are fetched based on the prefix of the query. Rankings of the plurality of query suggestions are determined based, at least in part, on the user's previous interactions in the search session with respect to at least one of the plurality of query suggestions. The at least one of the plurality of query suggestions has been previously provided to the user in the search session. The plurality of query suggestions are provided in the search session based on their rankings as a response to the input.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 depicts exemplary user interaction features/signals of a query suggestion, according to an embodiment of the present teaching;

DETAILED DESCRIPTION

Figure 1:
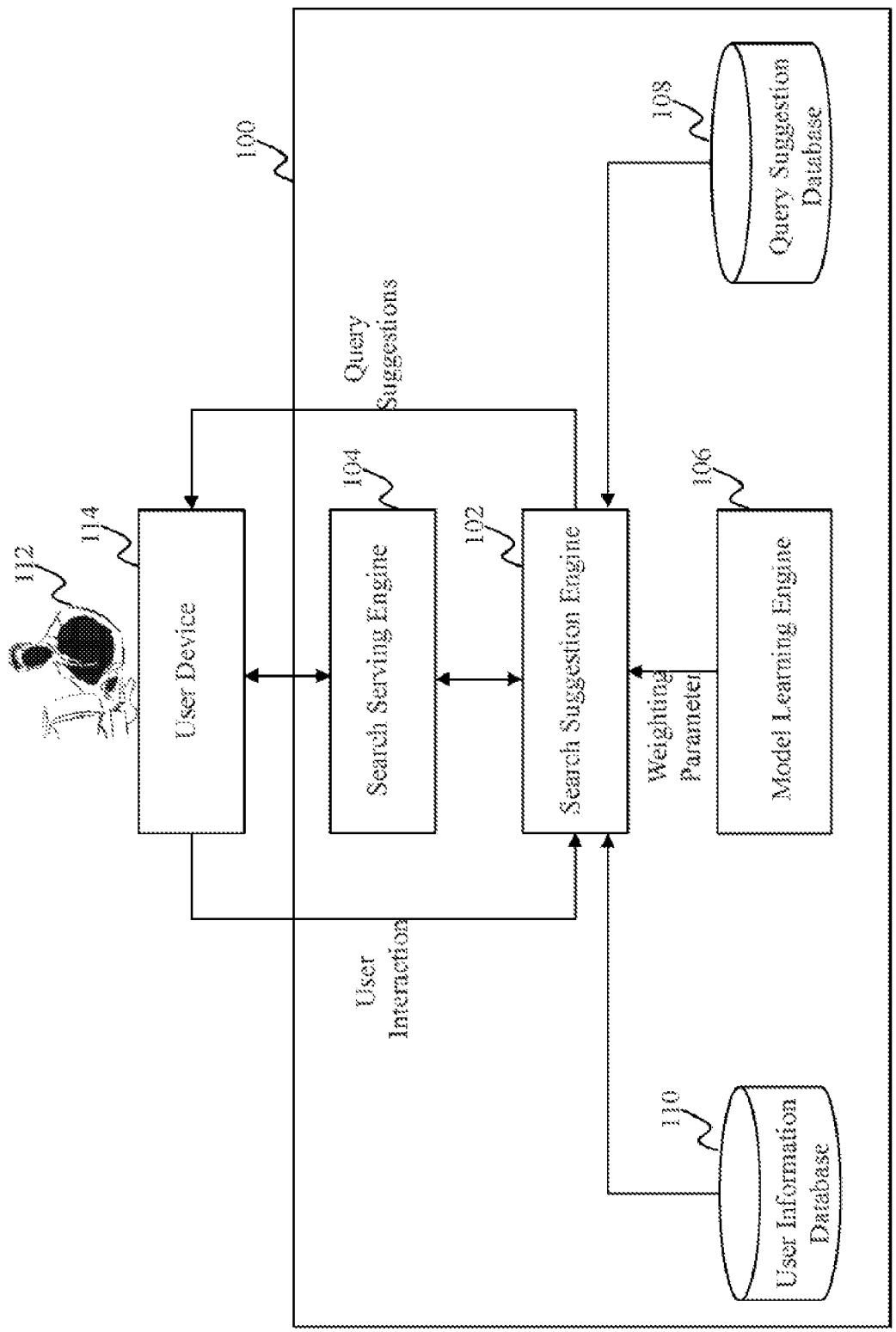
FIG. 1 is a high level exemplary system diagram of a system for providing query suggestions, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure describes method, system, and programming aspects of efficient and effective ranking query suggestions. The method and system as disclosed herein aims at improving end-users' search experience by reducing user efforts in formulating queries. In contrast to all the existing static query suggestion systems, for any prefix in the same search session, the method and system are able to dynamically and adaptively adjust the rankings of pre-indexed query suggestions at runtime by taking into consideration of the user's feedback with respect to query suggestions that appeared in previous suggestion lists triggered by previous keystrokes in the same search session. For example, the method and system may maintain ranking of suggested queries that appeared in previous suggestion lists triggered by previous keystrokes where the user skipped, and demote ranking of suggested queries that appeared in previous suggestion lists where the user examined carefully but did not select (negative feedback). Initial test results show that the method and system as disclosed herein outperform known "static" query suggestion systems in terms of mean reciprocal rank and success rate at top positions. In addition, since user feedback depends on both query and session, the method and system can be adaptive in different sessions where different user feedback can be received even for the same query. Moreover, as the method and system utilize the initial rankings of the pre-indexed query suggestions and adjust the rankings of certain query suggestions only when their user feedback has been detected in the same search session, the production of the ranking adjustment is very fast.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level exemplary system diagram of a system for providing query suggestions, according to an embodiment of the present teaching. In this embodiment, the system 100 is deployed on one or more servers and includes a search suggestion engine 102, a search serving engine 104, a model learning engine 106, a query suggestion database 108, and a user information database 110. A user 112 in this embodiment performs an online search through a user device 114 and the backend search serving engine 104. The user 112 instantly gets query suggestions provided by the backend search suggestion engine 102 in response to the user's partial query input (i.e., query prefix, e.g., the first one or several characters of a full query or first one or more words of a query with multiple words).

The user device 114 may be a laptop computer, desktop computer, netbook computer, media center, mobile device (e.g., a smart phone, tablet, music player, and global positioning system (GPS) receiver), gaming console, set-top box, printer, or any other suitable device. A search application, such as a web browser or a standalone search application, may be pre-installed on the user device 114 by the vendor of the user device 114 or installed by the user 112. The search application may serve as an interface between the user 112 and the remote search serving engine 104 and search suggestion engine 102. The search application may be stored in storage of the user device 114 and loaded into the memory once it is launched by the user 112. Once the search application is executed by one or more processors of the user device 114, the user device 114 sends a query or a partial query entered by the user 112 to the remote search serving engine 104 and search suggestion engine 102. The user device 114 then receives query suggestions in an order provided by the search suggestion engine 102. The user device 114 also receives query results, e.g., a list of hyperlinks, from the search serving engine 104 once the user 112 selects one of the query suggestions and submits the selected query suggestion to the search serving engine 104 for executing the search.

The search serving engine 104 in this example may be any suitable search engine. The search serving engine 104 is responsible for analyzing the received query from the user device 114, fetching query results, and returning the query results to the user device 114. Search queries, including the prefix of a search query, are continuously fed into the search suggestion engine 102 by the search serving engine 104 for generating and updating search query suggestions. For example, by matching with the query prefix, the search suggestion engine 102 may fetch query suggestions from various data sources, including the query suggestion database 108. Query suggestions may be pre-indexed in the query suggestion database 108 based on bias information, such as popularity, context, time, user interest, etc.

In this embodiment, the rankings of the pre-indexed query suggestions are dynamically and adaptively adjusted by the search suggestion engine 102 based, at least in part, on the user feedback of at least one of the query suggestions that has been previously presented to the user in the same search session. A "search session" may start from receiving the first character of the query until executing the search based on the query. For example, once the user 112 starts to input the very first character in the search bar towards formulating a single query, a new search session starts. The search session ends when the query is submitted to the search serving engine 104, e.g., by the user clicking the search button. In the same search session, each time when the user 112 inputs a new character of the query (i.e., inputting a new query prefix), the search suggestion engine 102 returns a list of ranked query suggestions based on the current query prefix. The list of query suggestions is refreshed in response to receiving a new query prefix. In this embodiment, the ranking of a query suggestion in each search session for a user 112 may be dynamically and adaptively adjusted by the search suggestion engine 102 based on the user's previous interactions with the same query suggestion that has been presented before to the user in the same search session. For example, the search suggestion engine 102 may maintain ranking of suggested queries that appeared in previous suggestion lists triggered by previous keystrokes where the user skipped (neutral feedback); and demote ranking of suggested queries that appeared in previous suggestion lists where the user examined carefully but did not click (negative feedback).

User interactions with respect to query suggestions in a search session may be continuously monitored by the search suggestion engine 102. The user interactions with a query suggestion may be measured by various features/signals, such as but not limited to, dwell time when the query suggestion was previously provided to the user in the same search session, number of occurrence of the query suggestion previously provided to the user in the same search session, and ranking of the query suggestion when it was previously provided to the user in the same search session, etc. All the features/signals of user interactions may be observed and measured by the search suggestion engine 102 in a search session, and their values are dynamically updated each time the query prefix is updated (e.g., receiving a new keystroke from the user). In this embodiment, the values of the user interaction features/signals may be adjusted by weighting parameters that are interred by the model learning engine 106. Both the values of user interaction features/signals and the weighting parameters are used for determining how likely certain user interaction features/signals can indicate the user's actual intention. For example, at one keystroke, if such signals are not strong (such as dwell time is short and ranking of the query in the suggestion list is low), the user may simply skip the query suggestion in the suggestion list without carefully examining it; thus, ranking of this query suggestion will less likely be demoted during subsequent keystrokes. Otherwise, if such signals are stronger (such as dwell time is longer and ranking of the query is on top of the suggestion list), the user may highly probably examine the query suggestion carefully; thus, the ranking of this query suggestion will probably be demoted during subsequent keystrokes if it was not selected after the user's careful examination.

In this embodiment, the adjustment of query suggestion rankings may be personalized for a specific user 112 based on the user information collected through the user device 114 and/or the user information stored in the user information database 110. The system 100 may identify the user 112 by comparing the user ID and/or browser cookie received via the user device 114 against the user account information stored in the user information database 110. The model learning engine 106 may infer different weighting parameters for different users based on their search behavior patterns in the past (e.g., different typing speeds) and provide corresponding weighting parameter for the identified user to the search suggestion engine 102. It is understood that a default weighting parameter may be inferred by the model learning engine 106 based on search behavior patterns of general user population so that even if the user 112 does not have its own weighting parameter (e.g., because he/she is a new user or his/her identity cannot be determined), the search suggestion engine 102 still can dynamically and adaptively adjust rankings of query suggestions for the user 112 by applying the default weighting parameter.

Figure 2:
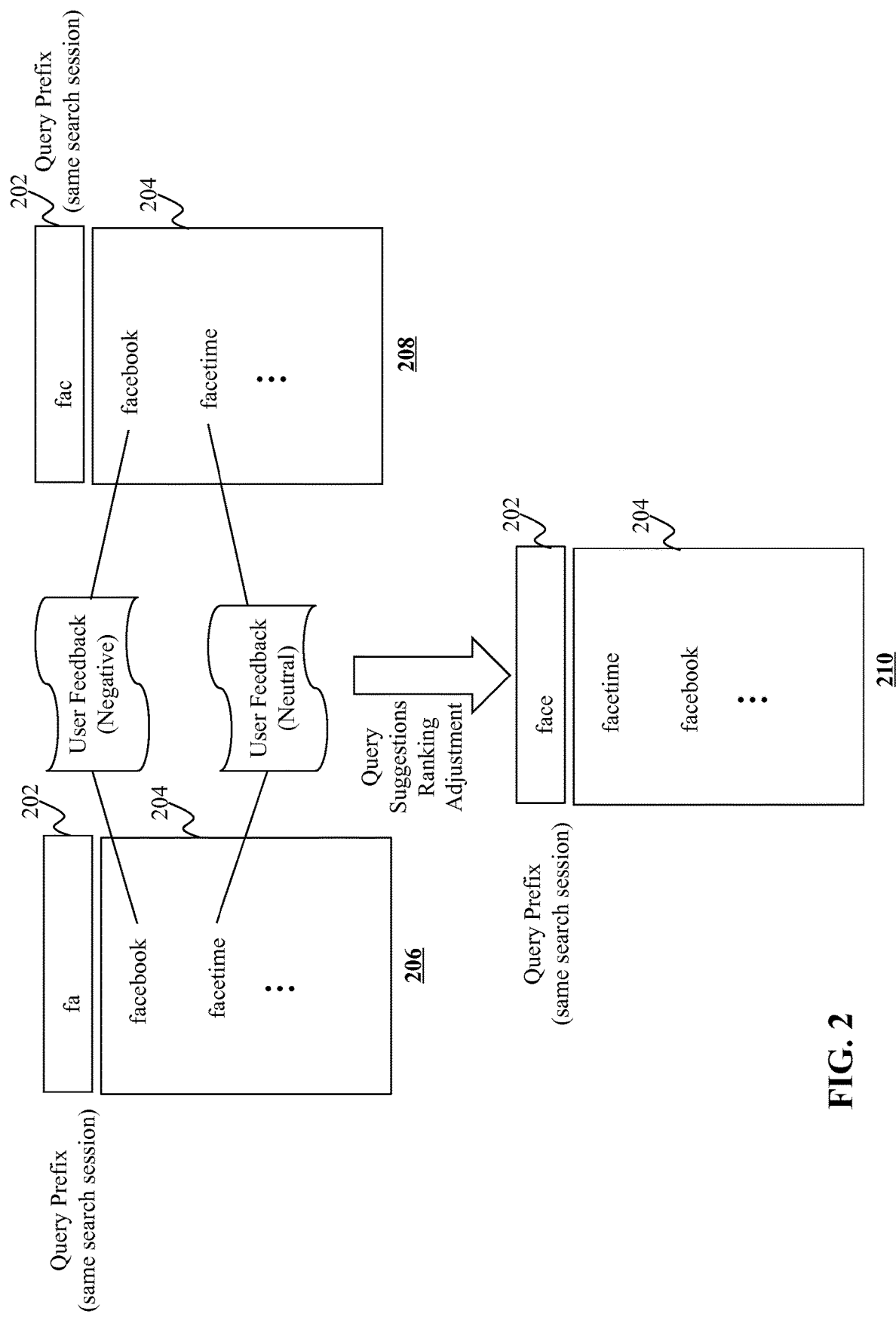
FIG. 2 depicts exemplary query suggestions ranking adjustment based on user feedback, according to an embodiment of the present teaching.

FIG. 2 depicts exemplary query suggestions ranking adjustment based on user feedback. In this example, a user inputs a query prefix in a search bar 202 and receives a list of query suggestions in a query suggestion box 204. When the user starts to type in the first character "f," a new search session is initiated. This search session continues until the user submits the full query to the remote search serving engine, i.e., executing the search of the query. In 206, the query prefix that is currently inputted in the search session is "fa," and the top two query suggestions for "fa" are "facebook" and "facetime," respectively. The two query suggestions may be pre-indexed based on various types of bias information, such as popularity among general population. When the user continues to type in more characters in the same session in formulating the full query, e.g., by inputting the new query prefix "fac" in 208, the query suggestions shown in the query suggestion box 204 are refreshed accordingly based on the new query prefix. In 208, the same top two query suggestions "facebook" and "facetime" are presented to the user.

The user interactions with respect to the already presented query suggestions, e.g., "facebook" and "facetime," are continuously monitored through the search session. Assume in this example, negative user feedback with respect to "facebook" has been observed in 206 and 208. For example, when "facebook" was ranked top in the suggestion lists for prefixes "fa" and "fac," the user carefully examined it but did not select it, which strongly indicate that the user does not want to query "facebook." In contrast, neutral user feedback with respect to the other query suggestion "facetime" has been observed in 206 and 208. For example, the user simply skipped the query suggestion "facetime" without examining it. Based on the observed user interactions with respect to the previously presented query suggestions, the initial rankings of those query suggestions determined based on bias information from pre-indexing may be adjusted at runtime in the same search session to better predict the user's actual intent for searching.

In 210, as the user continuous to type in the next character "e," a new query prefix—"face" is inputted in the search bar 202. Although the top two query suggestions for "face" are still "facebook" and "facetime," respectively, based on pre-indexing results, the actual rankings of the two query suggestions are adjusted based on their observed user feedback in the same search session. As mentioned above, as negative user feedback was observed for "facebook" and neutral user feedback was observed for "facetime," the ranking of "facebook" is demoted in 210 such that it is now ranked below "facetime" in the query suggestion box 204 in 210.

In another example (not shown), the method and system of providing query suggestions based on user feedback may be applied when a user prefers the full navigational name than the domain name only. For example, assume the user wants to query "people.com," when the user formulates the query during the keystrokes "p-e-o-p-l," the query suggestion "people" is ranked top in the suggestion list but the user did not select it, then the query suggestion "people" received strong negative feedback. So, when the query prefix becomes "people" after the keystroke "e," the ranking of query suggestion "people" is demoted because it received strong negative feedback so the ranking of "people.com" is promoted accordingly.

In still another example (not shown), the method and system of providing query suggestions based on user feedback may be applied when a user prefers queries in the form of "entity name+attribute" than "entity name" only because, when the user has clear intent about what she/he wants to query, the user may prefer more specific queries to avoid ambiguities. Like in the previous example, query suggestion "people.com" is more specific than query suggestion "people" as the search results of query "people" can be too diverse to include "people.com" in the top fetched results. Similarly, consider the user only wants to know the showtimes of "lefont sandy springs," when the user formulates the query during the keystrokes "l-e-f-o-n," the entity name "lefont sandy springs" is ranked top in the suggestion list but the user did not select it because the user knew an entity name query can result in too diverse search results, then the query suggestion "lefont sandy springs" received strong negative feedback. So, when the query prefix becomes "lefont," the ranking of query suggestion "lefont sandy springs" is demoted because it received strong negative feedback, and the ranking of "lefont sandy springs showtimes" is promoted accordingly.

In yet another example (not shown), the method and system of providing query suggestions based on user feedback may be applied when a user prefers new queries when reformulating earlier queries. For example, consider the user wants to query "detroit lions" after querying "detroit red wings," when the user reformulates the query from the last query "detroit red wings" to "detroit r" by consecutively hitting the backspace key, the query suggestion "detroit red wings" was ranked top but the user did not select it, then the query "detroit red wings" received strong negative feedback. So, when the query prefix becomes "detroit" after hitting the backspace key two more times, the ranking of query suggestion "detroit red wings" is demoted because it received strong negative feedback and other queries suggestion like "detroit lions" are promoted accordingly.

Figure 3:
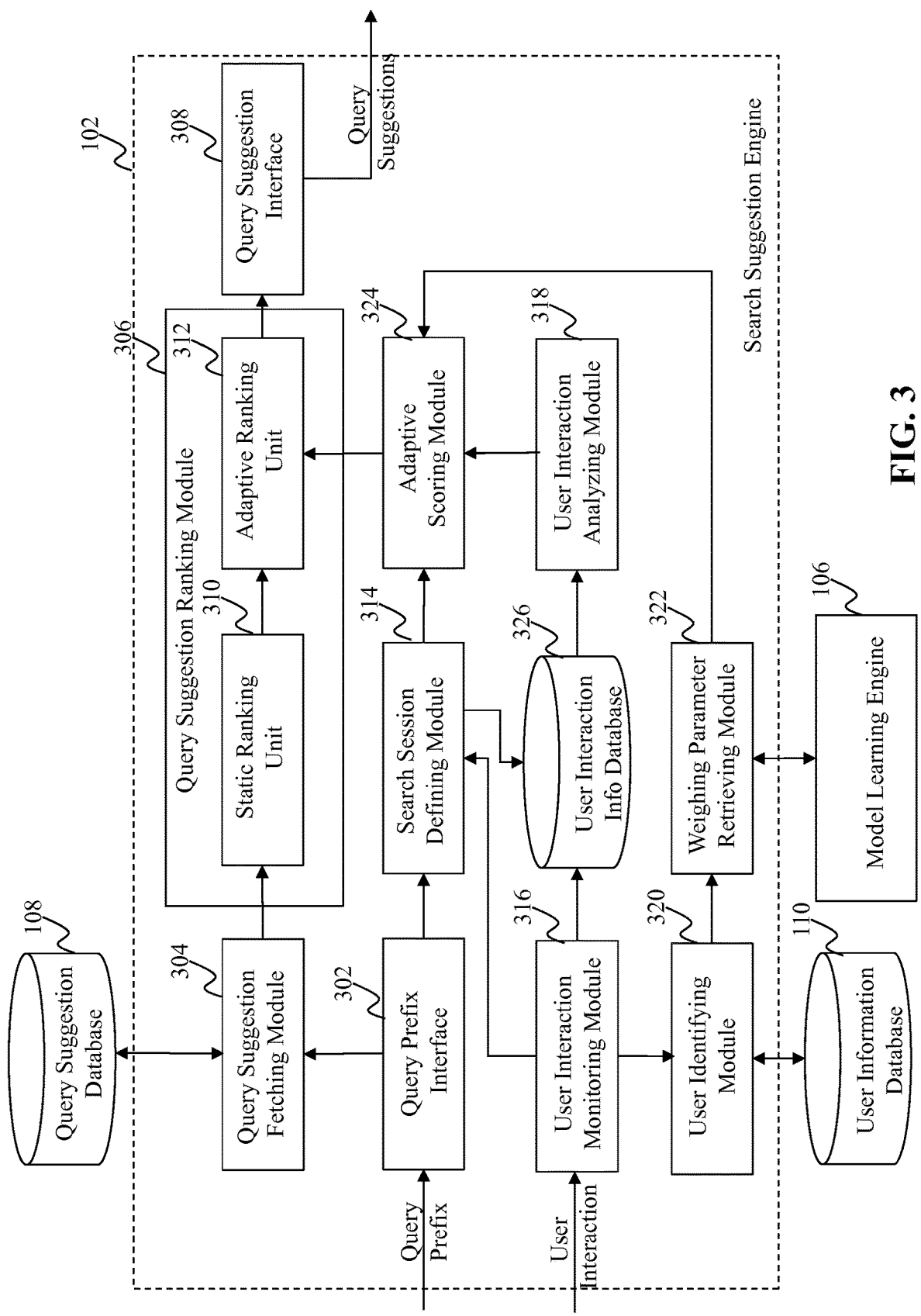
FIG. 3 is an exemplary diagram of a search suggestion engine of the system shown in FIG. 1, according to an embodiment of the present teaching.

FIG. 3 is an exemplary diagram of a search suggestion engine of the system shown in FIG. 1, according to an embodiment of the present teaching. In this embodiment, the search suggestion engine 102 includes a query prefix interface 302, a query suggestion fetching module 304, a query suggestion ranking module 306, and a query suggestion interface 308. The query prefix interface 302 in this embodiment is configured to receive query prefix inputted by a user. Based on the received query prefix, the query suggestion fetching module 304 is responsible for fetching corresponding query suggestions from the query suggestion database 108. In this embodiment, the query suggestions are pre-indexed offline and stored in the query suggestion database 108. Based on the received query prefix, the query suggestion fetching module 304 retrieves the top k query suggestions based on their initial rankings determined offline. It is understood that the value k may be set to any value, such as 5 or 10. With a fixed k value, sorting k query suggestions based on pre-indexing can be achieved in the order of constant time.

Figure 4:
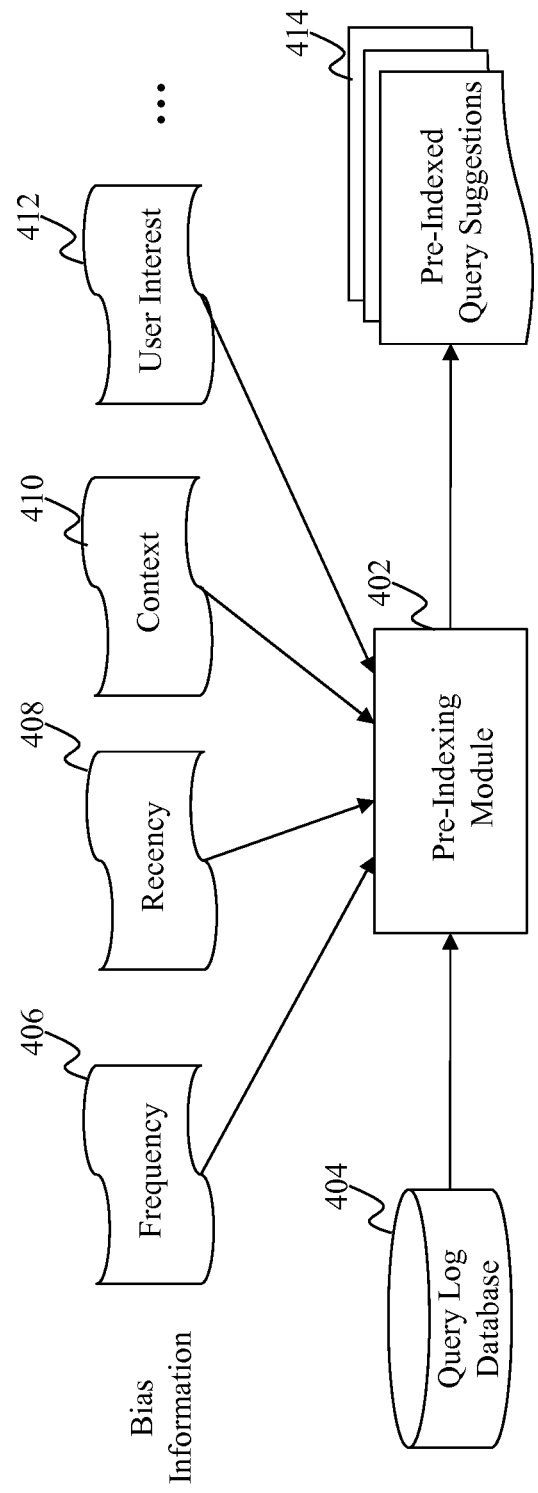
FIG. 4 depicts exemplary query suggestions pre-indexing based on bias information, according to an embodiment of the present teaching.

Referring now to FIG. 4, it depicts exemplary query suggestions pre-indexing based on bias information, according to an embodiment of the present teaching. In this embodiment, the pre-indexing is performed by a pre-indexing module 402 offline. The pre-indexing module 402 may be part of the search suggestion engine 102 or a standalone part separate from the search suggestion engine 102. In this embodiment, the pre-indexing module 402 mines query suggestions from a query log database 404 of general user population. The mined query suggestions may be indexed by the pre-indexing module 402 based on any types of bias information associated with each query suggestion, including for example, frequency 406, recency 408, context 410, user interest 412, etc., or any combination thereof. For example, the pre-indexing may be done based on popularity (e.g., utilizing historical frequency count), context (e.g., utilizing previous query information of users), time (e.g., utilizing time information), and/or personalization for a specific user (e.g., utilizing user profile information). The pre-indexed query suggestions 414 are stored in the query suggestion database 108.

Returning to FIG. 3, in this embodiment, the query suggestion ranking module 306 determines rankings of the fetched query suggestion to be provided to the user. In this embodiment, the query suggestion ranking module 306 includes a static ranking unit 310 and an adaptive ranking unit 312. The static ranking unit 310 may obtain the initial rankings of the fetched query suggestions based on bias information associated with each query suggestion. As mentioned above, the fetched query suggestions may have already been pre-indexed offline so that their initial rankings can be obtained by the static ranking unit 310 at the time when the query suggestions are fetched from the query suggestion database 108. The adaptive ranking unit 312, on the other hand, is configured to dynamically and adaptively adjust the initial rankings of the query suggestions based on the user's previous interactions with at least one of the query suggestions that has been previously provided to the user in the same search session. In this embodiment, the dynamic and adaptive ranking adjustment (re-ranking) is done at runtime when each time the query prefix is updated (e.g., a new character of the query is received) in a search session. It is understood that the ranking adjustment or re-ranking does not necessarily cause the change of the initial rankings from the static ranking unit 310. In this example, adaptive ranking scores may be used by the adaptive ranking unit 312 to be combined with the initial ranking scores of the query suggestions to determine whether the initial rankings of the query suggestions should be maintained or changed. The details of dynamic and adaptive ranking adjustment are described below. In this embodiment, the query suggestion interface 308 provides the re-ranked query suggestions to the user.

To calculate adaptive ranking scores, the search suggestion engine 102 in this embodiment further includes a search session defining module 314, a user interaction monitoring module 316, a user interaction analyzing module 318, a user identifying module 320, a weighting parameter retrieving module 322, and an adaptive scoring module 324. Some or all of the above-mentioned modules may work together to calculate adaptive ranking scores for query suggestions that have been previously provided to the user in the same search session based on the user's previous interactions with those query suggestions in the same search session. In this embodiment, the adaptive ranking scores are calculated and updated at runtime in response to each keystroke as the user formulates the search query. As the user feedback depends on search sessions even for the same query, the search session defining module 314 is used to identify each search session and provide such information for monitoring and analyzing user interactions. A "search session" may start from receiving the first character of the query until executing search based on the query. For example, once the search session defining module 314 determines from the query prefix received by the query prefix interface 203 that the user starts to input the very first character towards formulating a single query, the search session defining module 314 initiates a new search session. Once the search session defining module 314 determines that the user stops input any character and submits the query to the search serving engine 104, e.g., by clicking the search button, the search session defining module 314 ends the current search session.

The user interaction monitoring module 316 in this embodiment is configured to continuously monitor user interactions with any query suggestions presented to the user. In this embodiment, the user interactions include any user behavior patterns that can be inferred as negative or neutral feedback. For example, quickly skipping a query suggestion without carefully examining it may be considered as neutral feedback, while carefully examining a query suggestion without selecting it may be considered as negative feedback. Other user behavior patterns may also be taken into account in inferring user feedback, such as user typing speed. In some embodiments, certain user behavior patterns may be inferred as positive feedback, e.g., selecting a query suggestion. The user interactions may be measured based on various features/signals, such as dwell time when the query suggestion was previously provided to the user in the search session, number of occurrence of the query suggestion previously provided to the user in the search session, ranking of the query suggestion when it was previously provided to the user in the search session. FIG. 5 depicts exemplary user interaction features/signals of a query suggestion. In FIG. 5, the longer the maximum dwell time or total dwell time per keystroke was, the more likely the user expressed negative feedback with respect to the query suggestion q because the user likely spent a longer time in examining and considering the query suggestion q rather than quickly skipped it. Whether the query suggestion q is the last query suggestion or not is another user interaction feature/signal. If the query suggestion q appeared at the end of the query suggestion list, the user likely did not pay much attention to it. Also, if the query suggestion q has repeatedly appeared at the top of the suggestion list (e.g., the number of keystrokes where q is at rank 1 or 2 is relatively large) but the user did not select it, it is most likely that the user is not interested in this query suggestion q. The user interaction features/signals may be manually decided based on prior knowledge and/or automatically selected using machine learning approaches. It is understood that any other user interaction features/signals may be applied in some embodiments.

Back to FIG. 3, all the monitored user interaction information, e.g., user interaction features/signals, is continuously fed into a user interaction information database 326 by the user interaction monitoring module 316. Based on the search session information from the search session defining module 314, the user interaction analyzing module 318 is responsible for analyzing user interaction features/signals for each query suggestion that appeared in the same search session. In this embodiment, the values of each user interaction feature/signal are calculated by the user interaction analyzing module 318 for each query suggestion based on the user interaction information stored in the user interaction information database 326. For example, the maximum and total dwell time per keystroke where each query suggestion is in the suggestion list in the search session may be calculated by the user interaction analyzing module 318. Based on the natural of each user interaction feature, e.g., time, count, binary value, etc., any suitable approach may be applied by the user interaction analyzing module 318 for calculating the corresponding values.

Each user interaction feature/signal may be associated with a weighting parameter in determining its impact on adjusting the query suggestion rankings. The weighting parameter retrieving module 322 in this embedment retrieves weighting parameters associated with analyzed user interaction features/signals from the model learning engine 106. As described in detail below, each weighting parameter may be learned by the model learning engine 106 offline in the training phase. In one example, a probabilistic model may be used by the model learning engine 106. The probabilistic model may be a normalized softmax function of the adaptive ranking scores used for re-ranking the query suggestions. To maximize the probability of total observations of what the user's final queries are after expressing negative feedback via user interaction features/signals, the regularized log-likelihood of softmax function may be used as the objective function in an un-constrained optimization framework. To optimize the objective function, the batch-mode gradient descent method may be used to infer the weighting parameter. A weighting parameter may be a vector in which each element corresponds to one user interaction feature/signal. It is understood that in some embodiments, any other suitable machine learning models and approaches with corresponding objective functions may be used by the model learning engine 106 to learn and optimize weighting parameters of any user interaction feature/signals.

The weighting parameters may be personalized for different users in this embodiment. The user identifying module 320 in conjunction with the user information database 110 may be used to determine the identity of a user to whom the query suggestions are provided. For example, the user's identity may be determined through user ID, account information, and/or browser cookie. Based on the user identity, the weighting parameter retrieving module 322 may retrieve weighting parameters that are learned and optimized for the specific user. The details of personalizing weighting parameters are described below. Personalized weighting parameters are necessary as different users may exhibit different user behavior patterns that may affect the impact of user interaction features/signals. For example, different users have different typing speed. For experienced users, their most dwell time at each keystroke is around 0.2 second while the in-experienced users type slower, and most of their dwell time at each keystroke is around 0.8 second. Thus, the weighting parameters associated with dwell time-related user interaction features/signals may be affected by the difference in typing speed. As it is possible that a user's identity cannot be determined by the user identifying module 320 and/or the personalized weighting parameters for an identified user may not exist, default weighting parameters for general user population may be generated by the model learning engine 106 and retrieved by the weighting parameter retrieving module 322 as needed.

Figure 6:
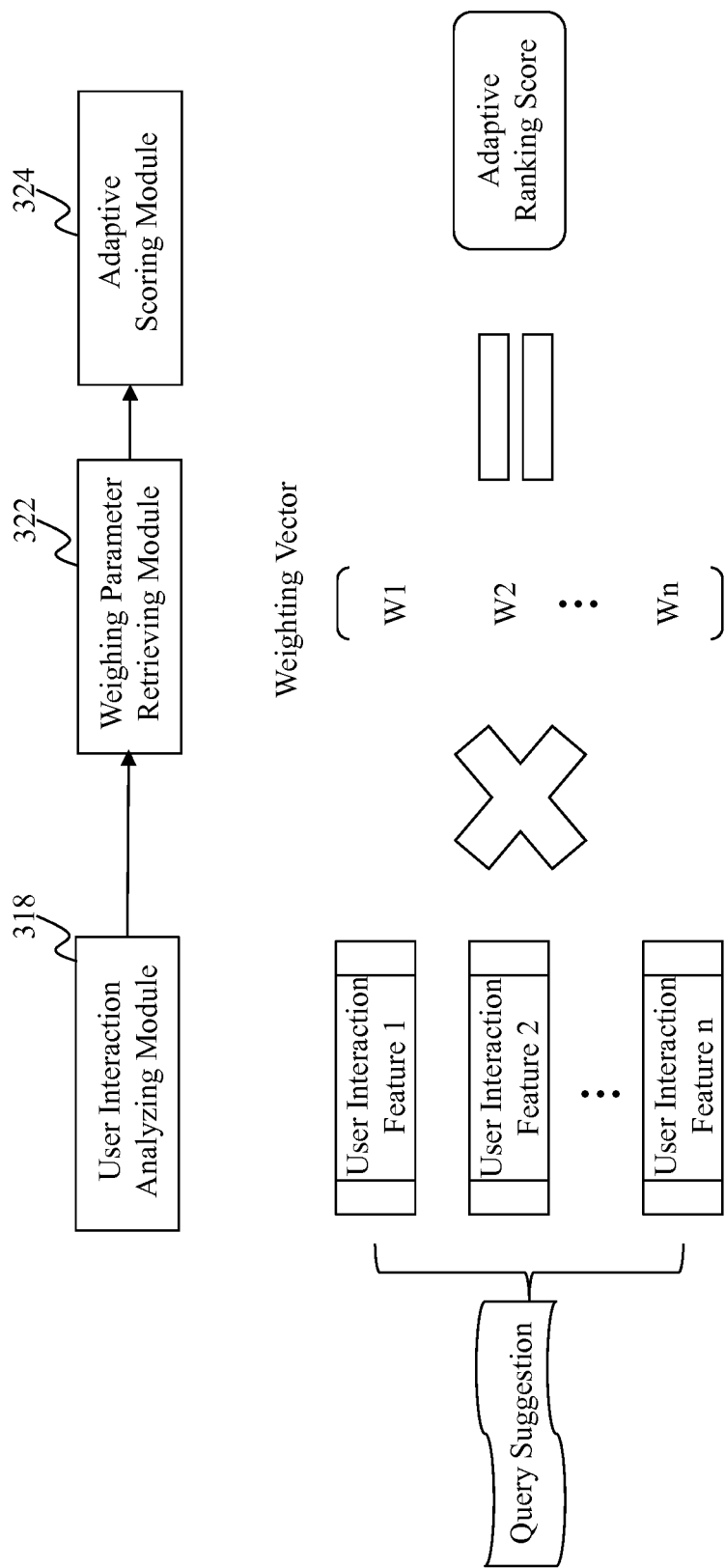
FIG. 6 depicts exemplary adaptive ranking score calculation for query suggestions, according to an embodiment of the present teaching.

The adaptive scoring module 324 in this embodiment calculates the adaptive ranking scores for each of the query suggestions that have been provided previously to the user in the same search session based on both the user interaction features/signals values provided by the user interaction analyzing module 318 and the weighting parameters provided by the weighting parameter retrieving module 322. FIG. 6 depicts exemplary adaptive ranking score calculation for query suggestions, according to an embodiment of the present teaching. As shown in FIG. 6, each query suggestion that has been provided to the user at least once in the suggestion list in a search session has its own adaptive ranking score calculated. Each user interaction feature 1, 2, . . . n is tracked from the user interaction information, and their values are determined by the user interaction analyzing module 318. The corresponding weighting vector in this example is retrieved by the weighting parameter retrieving module 322. The weighting vector includes multiple elements W1, W2, Wn, each of which is associated with the respective user interaction features 1, 2, . . . n. The weighting vector may be personalized for the specific user or a default parameter for general user population. The values of the user interaction features 1, 2, . . . n are then multiplied by the weighting vector to generate the adaptive ranking score for the specific query suggestion by the adaptive scoring module 324. The adaptive ranking score is then used to adjust the ranking of the specific query suggestion in the suggestion list during the same search session, by either maintaining its initial ranking, demoting its initial ranking, or promoting its initial ranking. In one example, each of the pre-indexed query suggestions may have its bias ranking score that has been calculated offline based on its associated bias information. The bias ranking scores are used to determine the initial rankings of the query suggestions. Some or all of the query suggestions may have their adaptive ranking scores dynamically and adaptively calculated at runtime as they have been presented to the user in a search session. In that case, the bias ranking scores and the adaptive ranking scores may be combined to generate combined rankings scores to determine the adjusted rankings of the query suggestions. That is, both the bias information of a query suggestion and user interaction information of the query suggestion during a search session are considered in determining the ranking of the query suggestion in the search session.

Figure 7:
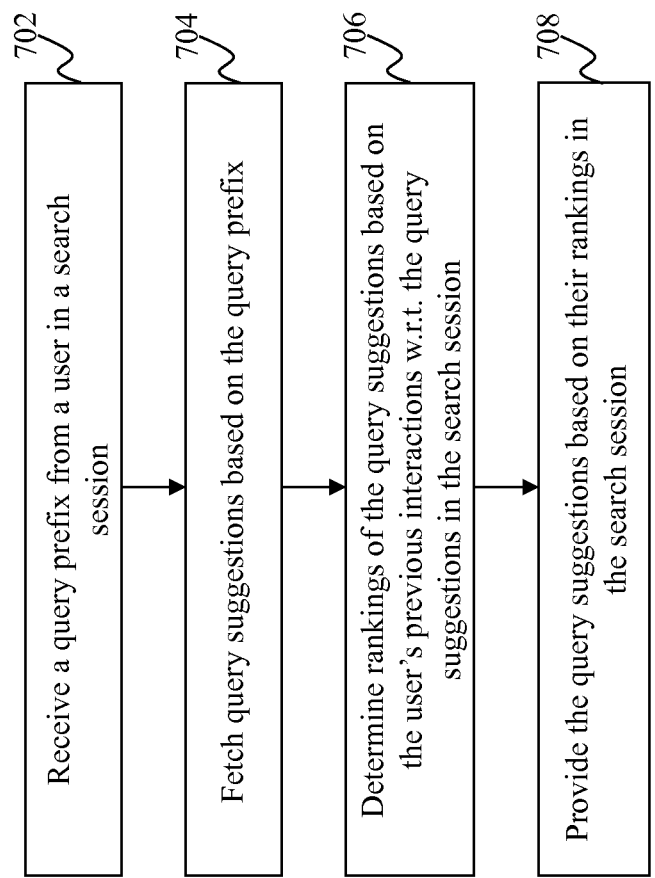
FIG. 7 is a flowchart of an exemplary process for providing query suggestions, according to an embodiment of the present teaching.

FIG. 7 is a flowchart of an exemplary process for providing query suggestions, according to an embodiment of the present teaching. Starting at 702, a query prefix is received from a user in a search session. It is understood that the query prefix may be continuously updated in the same search session towards formulating a single query as the user keeps typing more characters of the query. Each time the query prefix is updated (i.e., a new query prefix is inputted), the processes in FIG. 7 may be triggered. At 704, query suggestions are fetched based on the query prefix. The query suggestions may be pre-indexed offline based on their bias information. The number of query suggestions that are fetched may be predefined to ensure a reasonable response time. At 706, rankings of the fetched query suggestions are determined based, at least in part, on the user's previous interactions with respect to the query suggestions that have been previously presented in the search session. For example, the user's previous interactions may be abstracted as certain features/signals that indicate the user's search behavior patterns, which in turn may be used to estimate the probability that the user really examined a query suggestion carefully in previous suggestion lists but decided not to select it. This type of negative user feedback strongly indicates that the user is not interested in the query suggestion, and thus, such query suggestion's ranking should be demoted in the subsequent suggestion list in the same search session. At 708, the query suggestions are provided to the user in the search session based on their rankings.

Figure 8:
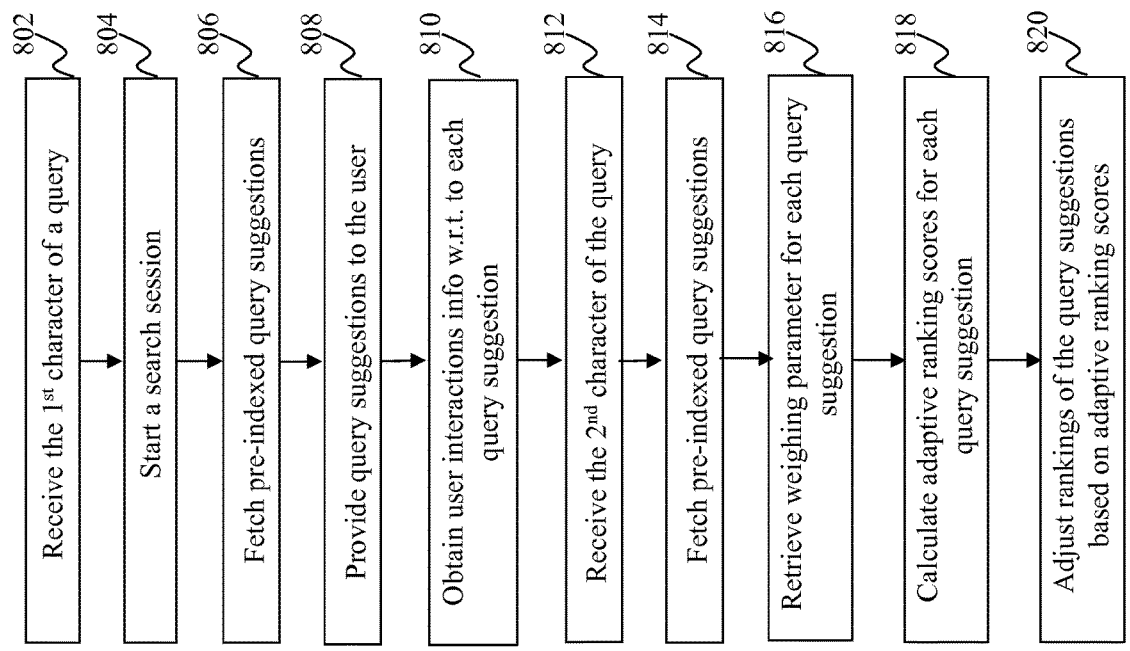
FIG. 8 is a flowchart of an exemplary process for adjusting query suggestions rankings based on adaptive ranking scores, according to an embodiment of the present teaching.

FIG. 8 is a flowchart of an exemplary process for adjusting query suggestions rankings based on adaptive ranking scores, according to an embodiment of the present teaching. Starting at 802, the first character of a query (the first query prefix) is received. In response to receiving the first character of the query, a new search session is started at 804. At 806, a first set of pre-indexed query suggestions are fetched based on the received character. At 808, the query suggestions are provided to the user based on their rankings determined offline by pre-indexing. At 810, user interaction information with respect to each query suggestion is obtained. The user interaction information may be any information associated with user search behaviors such as dwell time. At 812, the second character towards formulating the query is received from the user. At 814, a second set of pre-indexed query suggestions are fetched based on the first and second characters (the second query prefix). Rather than providing the query suggestions based on their initial rankings determined offline by pre-indexing, at 816, weighting parameter for each query suggestion that has been previously provided to the user at 808 is retrieved. For each previously-provided query suggestion, its user interaction features/signals obtained at 810 in conjunction with the corresponding weighting parameter are used at 818 to calculate an adaptive ranking score. The adaptive ranking score reflects the probability that the user is interested in the query suggestion or not based on the user's previous interactions with the same query suggestion in the same search session. At 820, rankings of the second set of query suggestions are adjusted based on the adaptive ranking scores. In other words, the user's interactions with respect to a query suggestion that was provided to the user in response to the first query prefix may affect the ranking of the same query suggestion in the same search session when it is provided to the user again in response to the second query prefix. It is understood that although only two query prefixes are shown in FIG. 8, the same processes may be applied to subsequent query prefixes inputted in the same search session.

Figure 9:
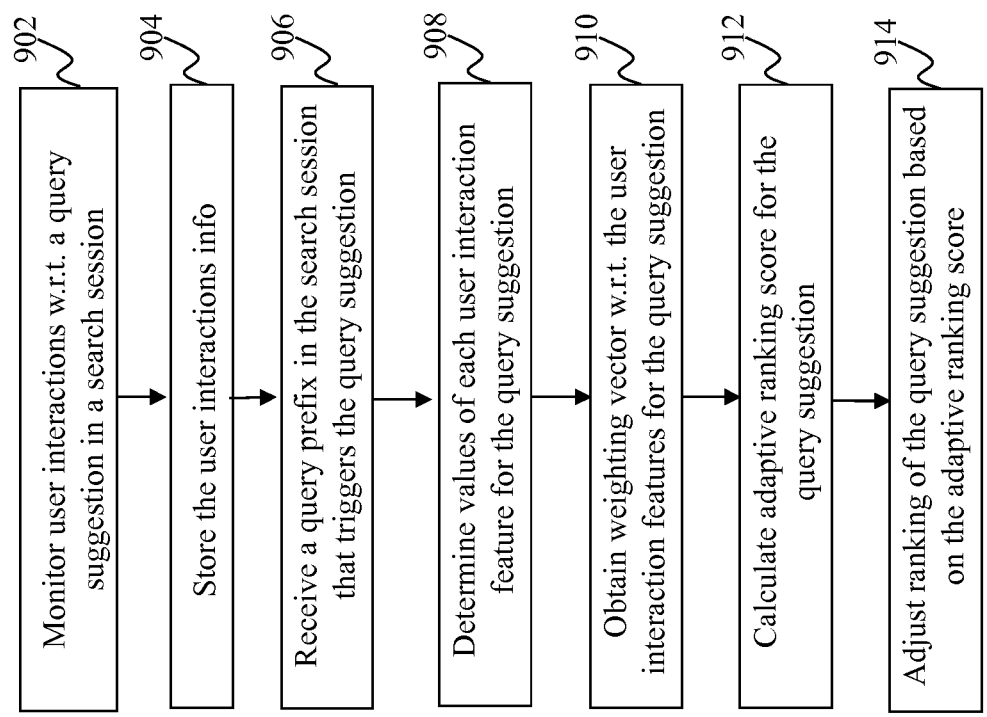
FIG. 9 is a flowchart of another exemplary process for adjusting query suggestions rankings based on adaptive ranking scores, according to an embodiment of the present teaching.

FIG. 9 is a flowchart of another exemplary process for adjusting query suggestions rankings based on adaptive ranking scores, according to an embodiment of the present teaching. Starting at 902, user interactions with respect to a query suggestion in a search session are monitored. At 904, the observed user interaction information is stored. At 906, a query prefix in the same search session is received, which triggers the fetching of query suggestions including the query suggestion at 902. For example, the prefix of the query suggestion at 902 matches the received query prefix. At 908, values of each user interaction feature/signal are determined from the stored user interaction information for the query suggestion. At 910, the weighting vector with respect to the user interaction features/signals is obtained for the query suggestion. Based on the values of the user interaction features/signals and the weighting vector, at 912, an adaptive ranking score is calculated for the query suggestion. At 914, the initial ranking of the query suggestion determined offline by pre-indexing is adjusted based on the adaptive ranking score.

Figure 10:
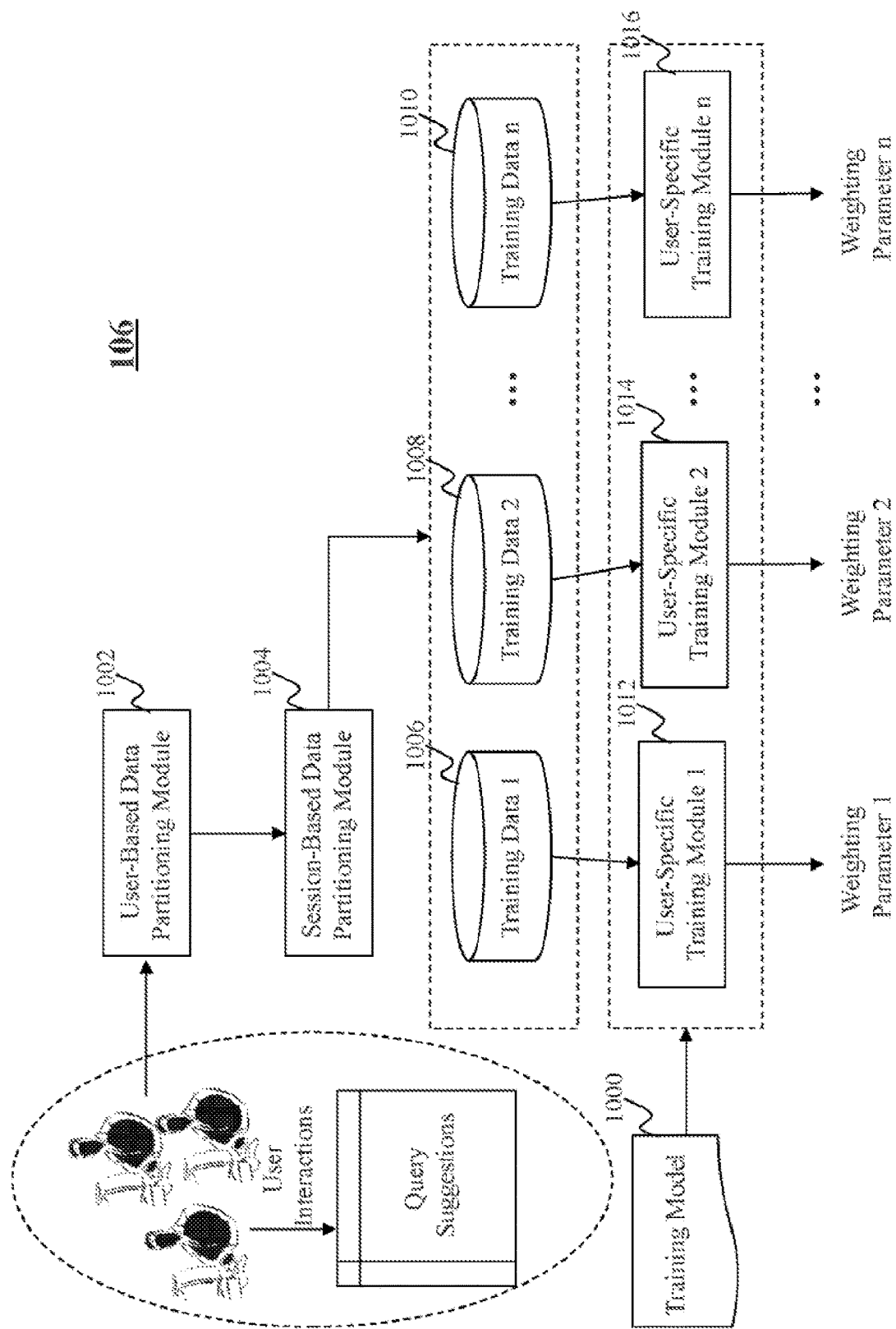
FIG. 10 is an exemplary diagram of a model learning engine of the system shown in FIG. 1, according to an embodiment of the present teaching.

FIG. 10 is an exemplary diagram of a model learning engine of the system shown in FIG. 1, according to an embodiment of the present teaching. The model learning engine 106 in this embodiment is configured to offline estimate weighting parameters for different users based on their historical user interaction data (training data) using any suitable machine learning model 1000 (training model). In this embodiment, historical user interaction information with respect to query suggestions may be collected from query logs. For personalized weighting parameter learning, the training data may be partitioned by a user-based data partitioning module 1002 and a session-based data partitioning module 1004. The user-based data partitioning module 1002 divides the training data based on different users because different users usually exhibit different search behaviors, such as typing speed. As the user feedback with respect to query suggestions is search session-dependent, the session-based data partitioning module 1004 may further divide the user interaction information for the same user into different groups corresponding to different search sessions.

Accordingly, training data corresponding to different users 1006, 1008, 1010 are formed and may be processed in parallel by multiple user-specific training modules 1012, 1014, 1016, respectively. Each of the user-specific training module 1012, 1014, 1016 estimates and optimize a weighting parameter for the corresponding user using the training model 1000. In one example, the training model 1000 is a normalized softmax function of the adaptive ranking scores. To maximize the probability of total observations of what the user's final queries are after expressing negative feedback via user interaction features/signals, the regularized log-likelihood of softmax function may be used as the objective function in an un-constrained optimization framework. To optimize the objective function, the batch-mode gradient descent method may be used to infer the associated weighting parameter. It is understood that any other suitable machine learning models and approaches with corresponding objective functions may be used by the model learning engine 106.

As the model learning engine 106 in this embodiment infers weighting parameter of user interaction features/ signals for each individual user, it is highly parallel and extremely scalable in big query log data. For example, in the Hadoop MapReduce framework, the offline training phase can be conducted in parallel for different users in different Reducer nodes. It is understood that in some embodiments, the training data may not be partitioned for specific user, but rather is used to estimate a default weighting parameter for general user population. Depending on whether the specific user can be identified at runtime, either the user-specific weighting parameter or the default weighting parameter can be provided by the model learning engine 106.

Figure 11:
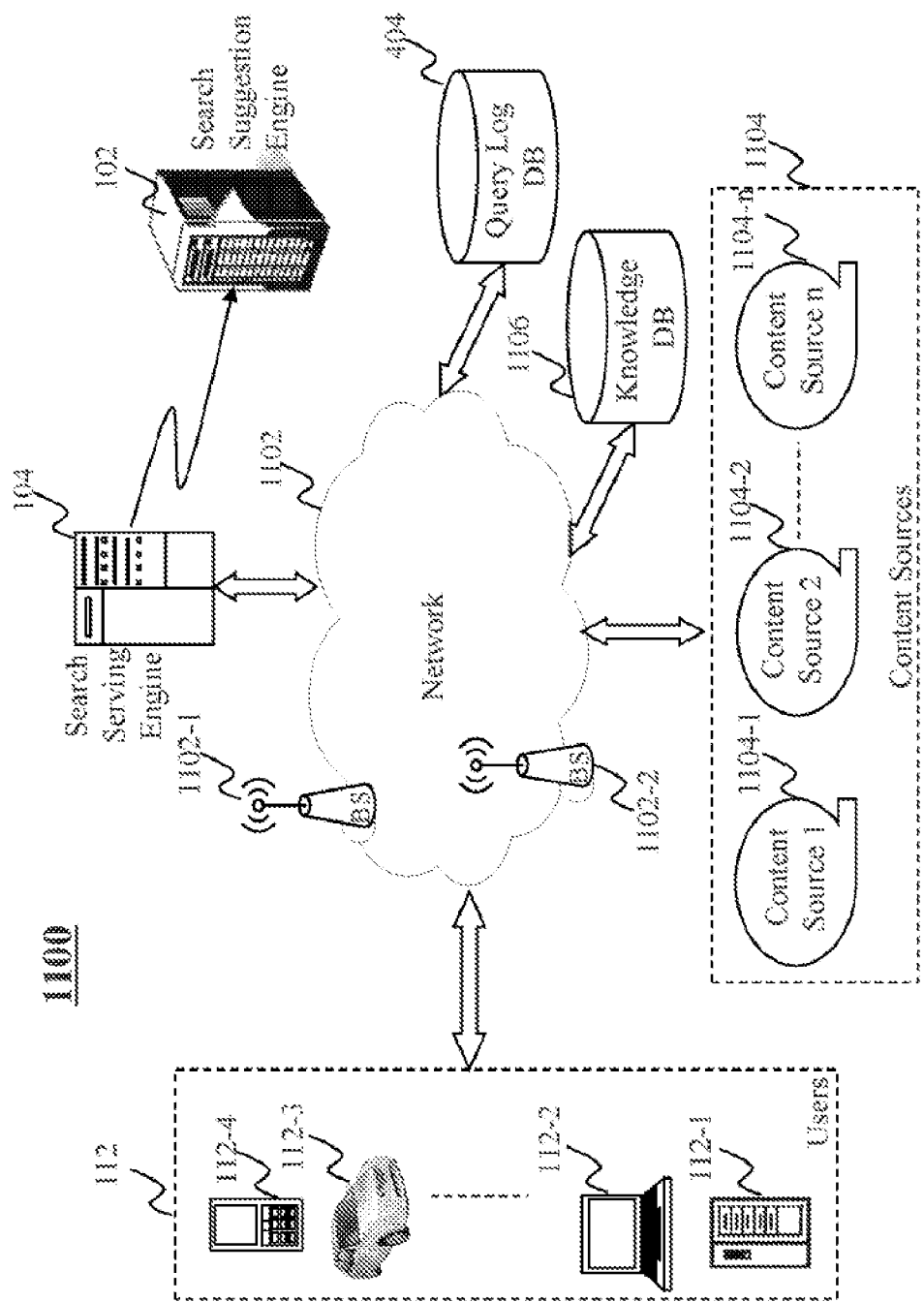
FIG. 11 depicts an exemplary embodiment of a networked environment in which the present teaching is applied, according to an embodiment of the present teaching.

FIG. 11 depicts an exemplary embodiment of a networked environment in which the present teaching can be applied, according to an embodiment of the present teaching. In FIG. 11, the exemplary networked environment 1100 includes the search suggestion engine 102, the search serving engine 104, one or more users 112, a network 1102, content sources 1104, the query log database 404, and a knowledge database 1106. The network 1102 may be a single network or a combination of different networks. For example, the network 1102 may be a local area network (LAN), a wide area network (WAN), a public network, a private network, a proprietary network, a Public Telephone Switched Network (PSTN), the Internet, a wireless network, a virtual network, or any combination thereof. The network 1102 may also include various network access points, e.g., wired or wireless access points such as base stations or Internet exchange points 1102-1, . . . , 1102-2, through which a data source may connect to the network 1102 in order to transmit information via the network 1102.

Users 112 may be of different types such as users connected to the network 1102 via desktop computers 112-1, laptop computers 112-2, a built-in device in a motor vehicle 112-3, or a mobile device 112-4. A user 112 may send a query or query prefix to the search serving engine 104 via the network 1102 and receive query suggestions and search results from the search serving engine 104. In this embodiment, the search suggestion engine 102 serves as a backend system for providing query suggestions to the search serving engine 104 based on user feedback. The search serving engine 104 and search suggestion engine 102 may access information stored in the query log database 404 and knowledge database 1106 via the network 1102. The information in the query log database 404 and knowledge database 1106 may be generated by one or more different applications (not shown), which may be running on the search serving engine 104, at the backend of the search serving engine 104, or as a completely standalone system capable of connecting to the network 1102, accessing information from different sources, analyzing the information, generating structured information, and storing such generated information in the query log database 404 and knowledge database 1106.

The content sources 1104 include multiple content sources 1104-1, 1104-2, . . . , 1104-n, such as vertical content sources (domains). A content source 1104 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search serving engine 104 may access information from any of the content sources 1104-1, 1104-2, . . . , 1104-n. For example, the search serving engine 104 may fetch content, e.g., websites, through its web crawler to build a search index.

Figure 12:
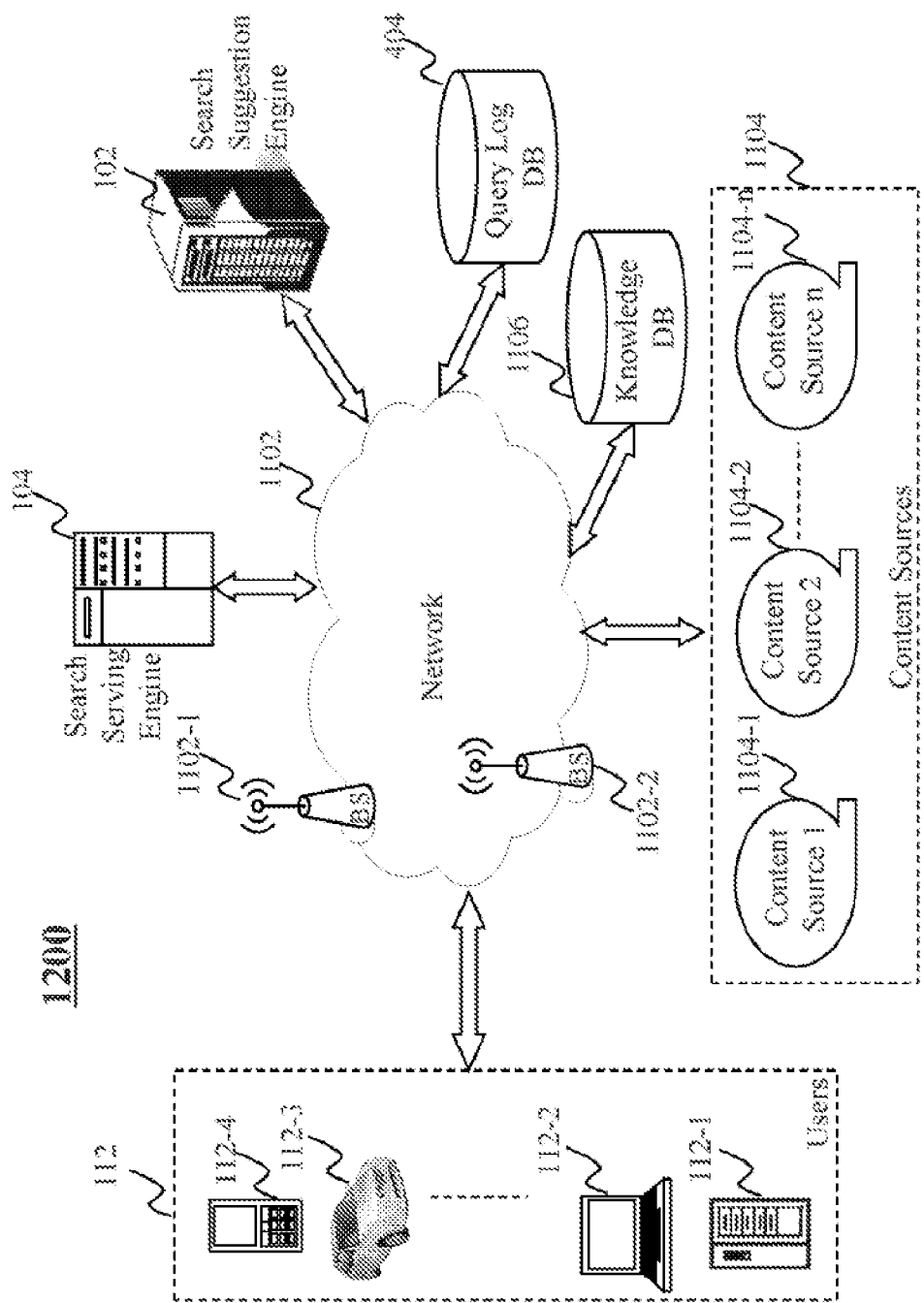
FIG. 12 depicts an exemplary embodiment of another networked environment in which the present teaching is applied, according to an embodiment of the present teaching.

FIG. 12 is a high level depiction of another exemplary networked environment 1200 in which the present teaching can be applied, according to an embodiment of the present teaching. The networked environment 1200 in this embodiment is similar to the networked environment 1100 in FIG. 11, except that the search suggestion engine 102 in this embodiment directly connects to the network 1102. For example, an independent service provider with the search suggestion engine 102 may serve multiple search engines via the network 1102.

Figure 13:
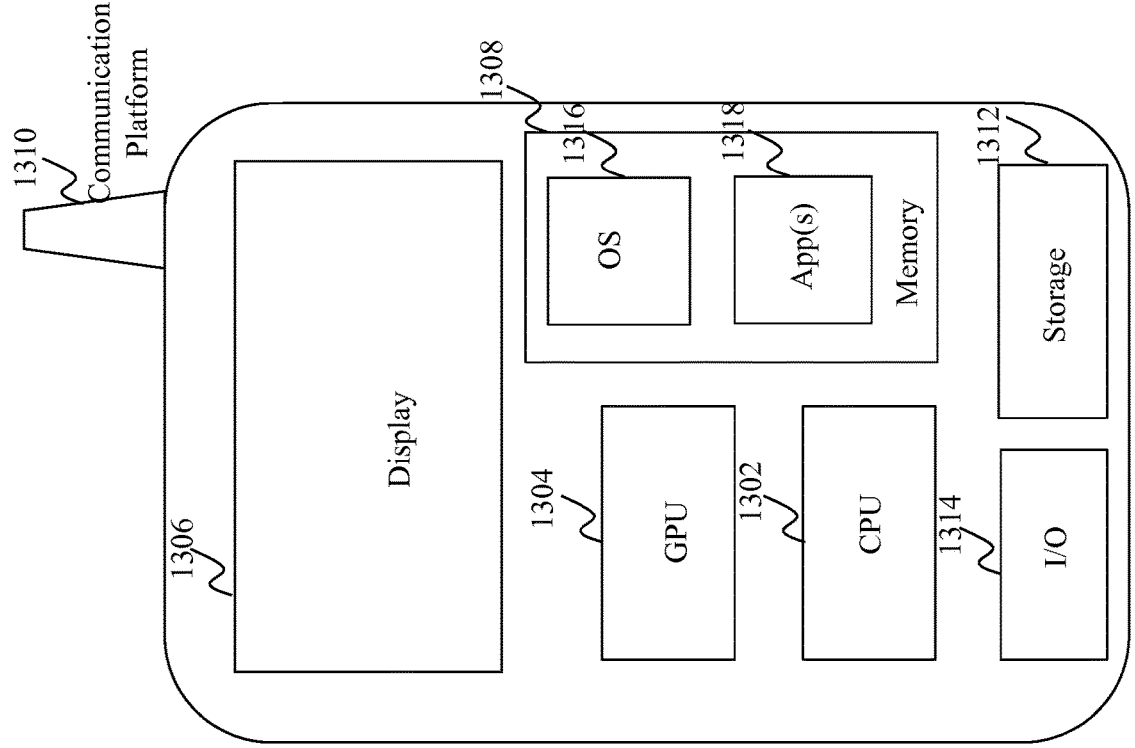
FIG. 13 depicts a general mobile device architecture on which the present teaching can be implemented.

FIG. 13 depicts a general mobile device architecture on which the present teaching can be implemented. In this example, the user device 114 is a mobile device 1300, including but is not limited to, a smart phone, a tablet, a music player, a handled gaming console, a GPS receiver. The mobile device 1300 in this example includes one or more central processing units (CPUs) 1302, one or more graphic processing units (GPUs) 1304, a display 1306, a memory 1308, a communication platform 1310, such as a wireless communication module, storage 1312, and one or more input/output (I/O) devices 1314. Any other suitable component, such as but not limited to a system bus or a controller (not shown), may also be included in the mobile device 1300. As shown in FIG. 13, a mobile operating system 1316, e.g., iOS, Android, Windows Phone, etc., and one or more applications 1318 may be loaded into the memory 1308 from the storage 1312 in order to be executed by the CPU 1302. The applications 1318 may include a web browser or any other suitable mobile search apps. Execution of the applications 1318 may cause the mobile device 1300 to perform some processing as described before. For example, the display of search suggestions and results is made by the GPU 1304 in conjunction with the display 1306. User inputs of search queries are received via the I/O devices 1314 and sent to the search serving engine 104 via the communication platform 1310.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 14:
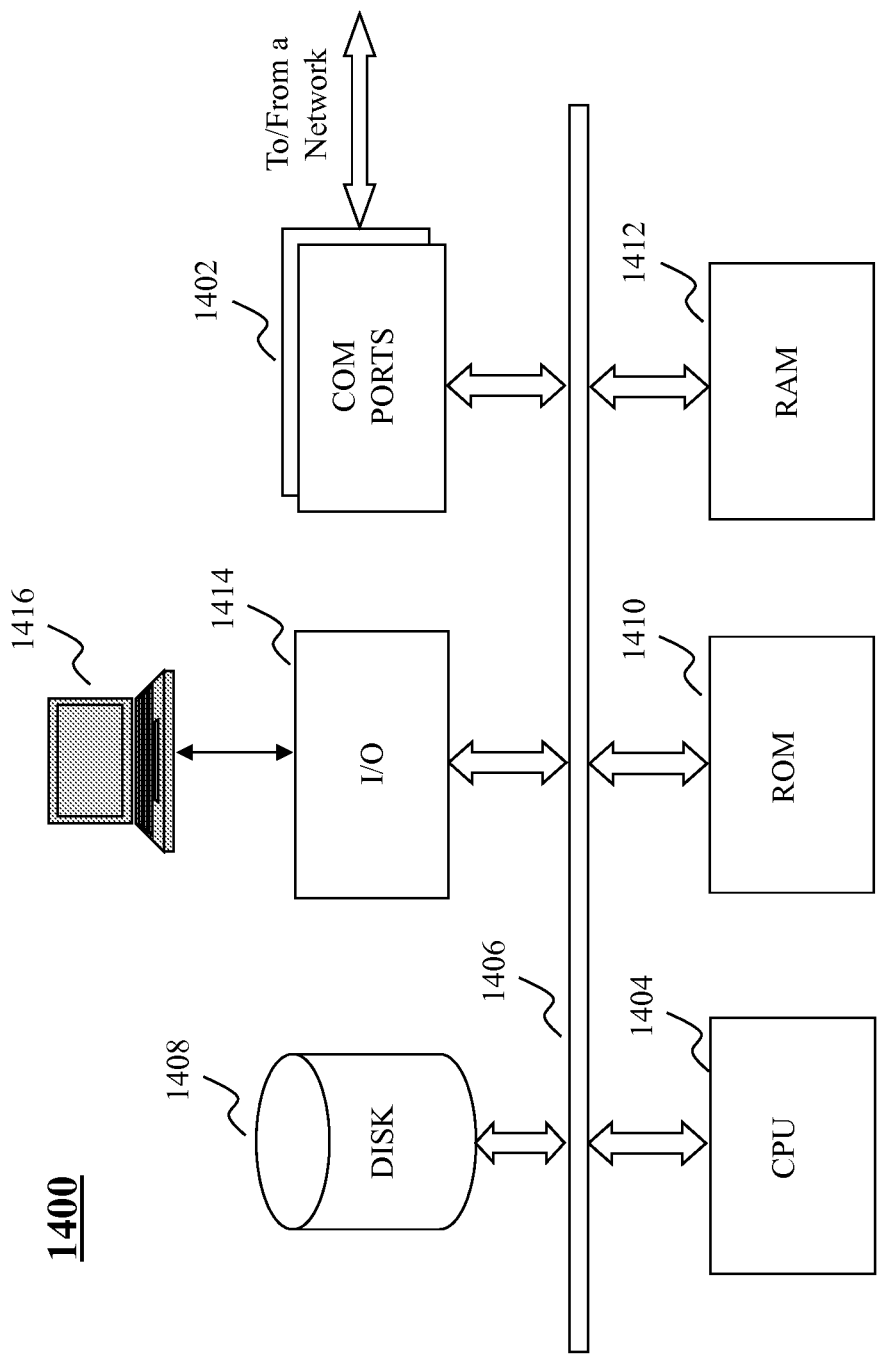
FIG. 14 depicts a general computer architecture on which the present teaching can be implemented.

FIG. 14 depicts a general computer architecture on which the present teaching can be implemented and has a functional block diagram illustration of a computer hardware platform that includes user interface elements. The computer may be a general-purpose computer or a special purpose computer. This computer 1400 can be used to implement any components of the query suggestion architecture as described herein. Different components of the system, e.g., as depicted in FIG. 1, can all be implemented on one or more computers such as computer 1400, via its hardware, software program, firmware, or a combination thereof. Although only one such computer is shown, for convenience, the computer functions relating to providing query suggestions may be implemented in a distributed fashion on a number of similar platforms, to distribute the processing load.

The computer 1400, for example, includes COM ports 1402 connected to and from a network connected thereto to facilitate data communications. The computer 1400 also includes a CPU 1404, in the form of one or more processors, for executing program instructions. The exemplary computer platform includes an internal communication bus 1406, program storage and data storage of different forms, e.g., disk 1408, read only memory (ROM) 1410, or random access memory (RAM) 1412, for various data files to be processed and/or communicated by the computer, as well as possibly program instructions to be executed by the CPU 1404. The computer 1400 also includes an I/O component 1414, supporting input/output flows between the computer and other components therein such as user interface elements 1416. The computer 1400 may also receive programming and data via network communications.

Hence, aspects of the method of providing query suggestions, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for providing query suggestions, the method comprising:
   receiving, in a search session, an input from a user;
   obtaining a plurality of query suggestions based on the input;
   determining an initial ranking of the plurality of query suggestions based on bias information comprising one or more of: popularity of each of the plurality of query suggestions, previous query information of the user, time information of each of the plurality of query suggestions, and the user's profile;
   machine-learning, via a training model based on historical user interaction data associated with the user within the search session, a weighting parameter indicating the user's prior search behavior patterns, wherein the weighting parameter is a vector in which each element corresponds to a user interaction feature;
   monitoring, by an engine in the search session, user feedback with respect to at least one of the plurality of query suggestions which is not selected by the user after being provided by the user;
   generating, based on the user feedback monitored in the search session and the weighting parameter, an adaptive ranking score indicating a probability whether the user is interested in a query suggestion;
   adjusting the initial ranking based on the adaptive ranking score;
   providing, based on the adjusted ranking, the plurality of query suggestions to the user; and
   in receipt of the user's selection of one of the plurality of query suggestions provided to the user, providing a hyperlink as a query result.

2. The method of claim 1, wherein the weighting parameter is estimated offline.

3. The method of claim 1, wherein the weighting parameter is personalized for the user.

4. The method of claim 1, wherein the search session extends from receipt of a first character of the input until an execution of a search based on the query submitted by the user.

5. The method of claim 1, wherein the user feedback indicates negative user feedback or neutral user feedback with respect to a query suggestion based on the input.

6. The method of claim 5, wherein the negative user feedback is represented by a first time spent by the user on a query suggestion based on the input, and the first time spent indicates that the user has examined the query suggestion before deciding not to select the query suggestion; and
   wherein the neutral user feedback is represented by a second time, shorter than the first time, spent by the user on the query suggestion based on the input, and the second time spent indicates that the user did not examine the query suggestion.

7. The method of claim 5, wherein the adjusted ranking is based on the negative user feedback or neutral user feedback.

8. A non-transitory, computer-readable medium having information recorded thereon for providing query suggestions, when read by at least one processor, effectuate operations comprising:
   receiving, in a search session, an input from a user;
   obtaining a plurality of query suggestions based on the input;
   determining an initial ranking of the plurality of query suggestions based on bias information comprising one or more of: popularity of each of the plurality of query suggestions, previous query information of the user, time information of each of the plurality of query suggestions, and the user's profile;
   machine-learning, via a training model based on historical user interaction data associated with the user within the search session, a weighting parameter indicating the user's prior search behavior patterns, wherein the weighting parameter is a vector in which each element corresponds to a user interaction feature;
   monitoring, by an engine in the search session, user feedback with respect to at least one of the plurality of query suggestions which is not selected by the user after being provided by the user;
   generating, based on the user feedback monitored in the search session and the weighting parameter, an adaptive ranking score indicating a probability whether the user is interested in a query suggestion;
   adjusting the initial ranking based on the adaptive ranking score;
   providing, based on the adjusted ranking, the plurality of query suggestions to the user; and
   in receipt of the user's selection of one of the plurality of query suggestions provided to the user, providing a hyperlink as a query result.

9. The medium of claim 8, wherein the weighting parameter is estimated offline.

10. The medium of claim 8, wherein the weighting parameter is personalized for the user.

11. The medium of claim 8, wherein the search session extends from receipt of a first character of the input until an execution of a search based on the query submitted by the user.

12. The medium of claim 8, wherein the user feedback indicates negative user feedback or neutral user feedback with respect to a query suggestion based on the input.

13. The medium of claim 12, wherein the negative user feedback is represented by a first time spent by the user on a query suggestion based on the input, and the first time spent indicates that the user has examined the query suggestion before deciding not to select the query suggestion; and
   wherein the neutral user feedback is represented by a second time, shorter than the first time, spent by the user on the query suggestion based on the input, and the second time spent indicates that the user did not examine the query suggestion.

14. The medium of claim 12, wherein the adjusted ranking is based on the negative user feedback or neutral user feedback.

15. A system for providing query suggestions, the system comprising:
- memory storing computer program instructions; and
- one or more processors that, in response to executing the computer program instructions, effectuate operations comprising:
- receiving, in a search session, an input from a user;
- obtaining a plurality of query suggestions based on the input;
- determining an initial ranking of the plurality of query suggestions based on bias information comprising one or more of: popularity of each of the plurality of query suggestions, previous query information of the user, time information of each of the plurality of query suggestions, and the user's profile;
- machine-learning, via a training model based on historical user interaction data associated with the user within the search session, a weighting parameter indicating the user's prior search behavior patterns, wherein the weighting parameter is a vector in which each element corresponds to a user interaction feature;
- monitoring, by an engine in the search session, user feedback with respect to at least one of the plurality of query suggestions which is not selected by the user after being provided by the user;
- generating, based on the user feedback monitored in the search session and the weighting parameter, an adaptive ranking score indicating a probability whether the user is interested in a query suggestion;
- adjusting the initial ranking based on the adaptive ranking score;
- providing, based on the adjusted ranking, the plurality of query suggestions to the user; and
- in receipt of the user's selection of one of the plurality of query suggestions provided to the user, providing a hyperlink as a query result.

16. The system of claim 15, wherein the weighting parameter is estimated offline.

17. The system of claim 15, wherein the weighting parameter is personalized for the user.

18. The system of claim 15, wherein the search session extends from receipt of a first character of the input until an execution of a search based on the query submitted by the user.

19. The system of claim 15, wherein the user feedback indicates negative user feedback or neutral user feedback with respect to a query suggestion based on the input.

20. The system of claim 19, wherein the negative user feedback is represented by a first time spent by the user on a query suggestion based on the input, and the first time spent indicates that the user has examined the query suggestion before deciding not to select the query suggestion; and
  wherein the neutral user feedback is represented by a second time, shorter than the first time, spent by the user on the query suggestion based on the input, and the second time spent indicates that the user did not examine the query suggestion.

* * * * *